United States Patent Office 3,448,118
Patented June 3, 1969

3,448,118
PREPARATION OF N-SUBSTITUTED α-PYRROLIDONES
Guy Chichery, Pierre-Benite, and Philippe Perras, Lyon, France, assignors to Rhone-Poulenc S.A., Paris, France, a French body corporate
No Drawing. Filed Apr. 4, 1966, Ser. No. 539,618
Claims priority, application France, Apr. 7, 1965, 12,310; Feb. 10, 1966, 49,168
Int. Cl. C07d 27/08
U.S. Cl. 260—326.5                    5 Claims

ABSTRACT OF THE DISCLOSURE

N-substituted-α-pyrrolidones are made by heating a succinic acid with a primary amine and hydrogen under pressure in the presence of a catalyst.

---

This invention relates to the preparation of N-substituted α-pyrrolidones in which the carbon atoms in the 3- and/or 4-positions may be alkylated.

N-methyl-α-pyrrolidone is a useful solvent, e.g. for polyurethanes, polyacrylonitriles and heterocyclic polymers of high melting point. Clearly, it is desirable to produce it as cheaply as possible.

A number of processes for the preparation of N-methyl-α-pyrrolidone from succinic acid are known. One (see French Patent No. 1,031,145) consists in reacting methanol with α-pyrrolidone itself obtained by the action of ammonia and hydrogen on succinic acid or anhydride (as in French Patent No. 1,338,676). Other processes consist in electrochemically or catalytically reducing N-methyl-succinimide, obtained by the action of methylamine on succinic acid. Recently, Romanovsky et al. (Khim. Promyshl., 491–2, (1963), C.A., 60, 1680[a]), succeeded in preparing N-methyl-α-pyrrolidone from succinic acid by this latter process: they first prepared N-methyl-succinimide (in a yield of 57.6%) and then catalytically reduced it to N-methyl-pyrrolidone in a yield of 71.6%. However, these same authors were unable to synthesise N-methyl-pyrrolidone in a single stage by hydrogenation of succinic acid in the presence of methylamine.

It has now been found that N-substituted α-pyrrolidones, in which the carbon atoms in the 3- and/or 4-positions may be alkylated, can be prepared directly and in a single stage, by heating succinic acid, or an alkyl-succinic acid, with a primary amine and hydrogen under superatmospheric pressure in the presence of a hydrogenation catalyst. The reaction which takes place may be represented as follows:

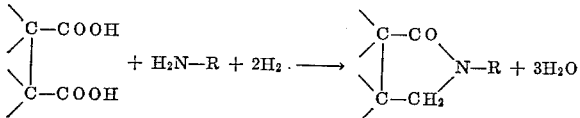

in which —R represents a monovalent organic radical, more particularly alkyl or cycloalkyl.

This process is simple to operate and gives good yields, notably in the case of the commercially important N-methyl-α-pyrrolidone. Since, moreover, succinic acid, the acid employed, is now a by-product in the oxidation of cyclohexane to adipic acid, the usefulness of this new process, especially in the preparation of N-methyl-α-pyrrolidone is clearly apparent.

Any alkylsuccinic acid which comprises one or more alkyl radicals, notably lower alkyl radicals (i.e. alkyl of 1 to 6 carbon atoms), for example mono- or di-methyl-succinic acid can be used. When the alkylsuccinic acid employed is asymmetrical, which is the case, more particularly, with monoalkylsuccinic acids, the product of the process is a mixture of isomeric N-substituted alkylpyrrolidones. Thus, with a monoalkylsuccinic acid, the mixture comprises N-substituted 3-alkyl- and 4-alkyl-pyrrolidones.

The amine may be, more particularly, a monoalkyl amine of 1 to 6 carbon atoms or a monocycloalkylamine of 5 or 6 carbon atoms, for example monomethyl-, monoethyl-, monopropyl- and monocyclohexylamine.

The amine used in the reaction may be anhydrous or in the form of an aqueous solution. The best yields are obtained if 1 mol of amine is employed per mol of the succinic acid. However, with higher proportions of amine, e.g. up to 2 mol per mol of acid, in yields are still satisfactory. Beyond this limit, however, the yields are less satisfactory.

The reaction is carried out in the presence of a hydrogenation catalyst, e.g. a Raney metal, (nickel or cobalt), or a cobalt, nickel, ruthenium or palladium catalyst. The quantities may be 0.1% to 10% of metal based on the weight of the succinic acid, an excess not being disadvantageous because the catalyst may be re-used.

If desired, the reaction may be carried out in a solvent to dilute the reaction medium, and, for continuous operation, the use of such a solvent is preferred. Water, dioxan, tetrahydrofuran or any other solvent inert under the operating conditions may be employed.

The reaction takes place under superatmospheric hydrogen pressure which may vary within fairly wide limits. It is preferable to operate under fairly high pressures in order to secure a satisfactory reaction speed. In practice, therefore, pressures of at least 50 bars, and preferably even above 220 bars, are employed, the temperature being from 200° to 300° C. These operating conditions are maintained until the stoichiometric quantity of hydrogen has been absorbed. They are, however, not critical and are related both to each other and to the other conditions of the process.

In addition to the desired products, variable quantities, depending on the operating conditions, of α-pyrrolidones which are not substituted on the nitrogen atom, and of imides corresponding to the acids and amines employed are produced. These by-products may be utilised. More particularly, the imides may be converted into the corresponding N-substituted-α-pyrrolidones by reduction or recycled in a subsequent operation of the process of the invention.

The following examples illustrate the invention.

Example 1

47 cc. of 33% aqueous monomethylamine solution (0.5 mol), 59 g. (0.5 mol) of succinic acid, 50 cc. of dioxan, and 7.7 g. of a 60% cobalt catalyst deposited upon kieselguhr (Girdler G–67–RS cobalt), are introduced into a 500 cc. autoclave mounted on a shaker-type agitator and hydrogen sufficient to produce a pressure of 150 bars is introduced. Agitation is started and the autoclave is heated. The absorption of hydrogen begins at 250° C., and this temperature is maintained until 22.4 litres of hydrogen have been absorbed. The duration of the heating is 11 hours. The operation is then stopped and the autoclave is rapidly cooled with ice-cold water. The catalyst is filtered off and washed on the filter with 200 cc. of ethanol. The filtrate is subjected to distillation at normal pressure up to 150° C. and the water, ethanol and an unrecovered volatile fraction are eliminated. After distillation in vacuo (20 mm. Hg), 42.9 g. of a fraction containing 92.7% of N-methyl-α-pyrrolidone and 7.3% of N-methyl-succinimide are collected at a vapour temperature of 85–130° C. The composition is determined by chromatography: it is also found that the fraction contains no pyrrolidone. The yields is 80.5% of the theoretical.

Two further experiments are carried out, in which the quantities of aqueous methylamine solution are 2 mol and 0.9 mol respectively, the other factors remaining unchanged. In both cases, the duration of the absorption of hydrogen, which also starts at 250° C., is 12 hours 30 minutes, and the results obtained are as follows:

| Mol of methyl-amine per mol of succinic acid | N-methyl-α-pyrrolidone, percent | Pyrrolidone, percent | N-methyl-succinimide, percent |
|---|---|---|---|
| 4 | 15.3 | 10.7 | 64 |
| 1.8 | 57.8 | 23.3 | 3 |

Example 2

In an apparatus identical with that of Example 1, 59 g. (0.5 mol) of succinic acid, 15.5 g. (0.5 mol) of anhydrous monomethylamine, and hydrogen at an initial pressure of 150 bars, are reacted in the presence of 5.9 g. of Raney nickel and 50 cc. of dioxan. The autoclave is heated and when the temperature reaches 250° C., absorption of hydrogen commences. At the end of 5 hours 15 minutes, 22.4 litres of hydrogen have been absorbed. Heating is stopped and the reaction mass is worked up as in Example 1. 43.7 g. of product containing 92.6% of N-methyl-α-pyrrolidone and 7.4% of N-methyl-succinimide are obtained. It is found by chromatography that it contains no pyrrolidone. The yield is 81.8% of the theoretical.

If the same experiment is repeated, replacing the Raney nickel by 10 g. of 10% palladium on charcoal the operation lasts 4 hours, 45 minutes, and 38.37 g. of a fraction containing 84.5% of N-methyl-α-pyrrolidone are obtained: a yield of 65.5%.

Example 3

Using the procedure of Example 1, 68.2 g. of 33% aqueous monoethylamine solution, 59 g. of succinic acid, 50 cc. of dioxan, 15.5 g. of a catalyst comprising 60% of cobalt on kieselguhr, and hydrogen at an initial pressure of 150 bars are reacted together. The reaction temperature is 250° C. as in Example 1 and the duration of the operation is 5 hours 45 minutes. 41 g. of a fraction, B.P.=97–135° C./20 mm. Hg, are thus obtained, containing 64.2% of N-ethyl-α-pyrrolidone, a yield of 46.8%.

Example 4

50 g. of succinic acid (0.5 mol), 49.5 g. of cyclohexylamine (0.5 mol), 50 cc. of dioxan, and 15.5 g. of a catalyst comprising 60% of cobalt are introduced into a 500 cc. autoclave. Hydrogen is then introduced to a pressure of 150 bars and the autoclave is heated to 250° C. The heating and the hydrogen pressure are maintained until 22.4 litres of hydrogen have been absorbed (the duration of the heating is 6 hours 15 minutes). The catalyst is then separated by filtration, the solvent is eliminated from the filtrate by distillation, and the residue is distilled under reduced pressure. A fraction, B.P.=70–160° C./0.3 mm. Hg, is obtained, weighing 49.3 g., and containing 79.8% of N-cyclohexylpyrrolidone, determined chromatographically. The yield is 47.2%.

Example 5

33 g. of methylsuccinic acid (0.25 mol), 7.75 g. of monomethylamine (0.25 mol), 25 cc. of dioxan and 7.7 g. of catalyst containing 60% of cobalt deposited upon kieselguhr are introduced into a 250-cc. autoclave. Hydrogen is introduced to a pressure of 150 bars and the temperature is brought to 250° C. The heating and pressure are maintained until a volume of 11.2 litres of hydrogen has been absorbed (the duration of heating is 6 hours 30 minutes). After filtration, followed by separation of the solvent by distillation, 22 g. of a fraction, B.P.=78–120° C./17 mm. Hg, are collected made up of 91.4% of a mixture of 1,3-dimethyl- and 1,4-dimethylpyrrolidone, in a proportion of 3:7 as determined chromatographically. The yield of the mixture of isomers is 71.2%.

We claim:
1. Process for the preparation of an N-substituted-α-pyrrolidone which comprises heating at from 200° to 300° C. succinic acid, or an alkyl-succinic acid, with a primary amine in a molecular ratio of acid to amine of 1:1 to 1:2 under hydrogen at a pressure of at least 50 bars, and in the presence of a hydrogenation catalyst.

2. Process according to claim 1 in which the primary amine is an alkylamine.

3. Process according to claim 1 in which the primary amine is a cycloalkylamine.

4. Process according to claim 1 in which succinic acid is heated with methylamine.

5. Process according to claim 1 in which the succinic acid and the primary amine are used in substantially equimolar amounts.

References Cited

UNITED STATES PATENTS 3,109,005  10/1963  Lidov _____ 260—326.5

ALEX MAZEL, *Primary Examiner.*

JOSE TOVAR, *Assistant Examiner.*